United States Patent
Park et al.

(10) Patent No.: US 9,552,755 B2
(45) Date of Patent: Jan. 24, 2017

(54) METHOD OF DISPLAYING AN IMAGE AND DISPLAY APPARATUS PERFORMING THE METHOD

(71) Applicant: SAMSUNG DISPLAY CO., LTD., Yongin, Gyeonggi-Do (KR)

(72) Inventors: Jae-Byung Park, Seoul (KR); Kwang-Keun Lee, Osan-si (KR); Nam-Seok Roh, Seongnam-si (KR); Seon-Tae Yoon, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 36 days.

(21) Appl. No.: 14/247,135

(22) Filed: Apr. 7, 2014

(65) Prior Publication Data
US 2015/0042700 A1 Feb. 12, 2015

(30) Foreign Application Priority Data
Aug. 7, 2013 (KR) .................. 10-2013-0093420

(51) Int. Cl.
| | |
|---|---|
| *G09G 5/00* | (2006.01) |
| *G09G 3/20* | (2006.01) |
| *G06F 3/12* | (2006.01) |
| *G09G 3/00* | (2006.01) |
| *G09G 3/34* | (2006.01) |
| *G09G 3/36* | (2006.01) |
| G09G 3/32 | (2016.01) |

(52) U.S. Cl.
CPC .......... *G09G 3/2003* (2013.01); *G06F 3/1243* (2013.01); *G09G 3/003* (2013.01); *G09G 3/3413* (2013.01); *G09G 3/3607* (2013.01); *G09G 3/3208* (2013.01); *G09G 3/3648* (2013.01); *G09G 2310/0235* (2013.01); *G09G 2320/0238* (2013.01); *G09G 2354/00* (2013.01)

(58) Field of Classification Search
CPC .......... G09G 3/22; G09G 3/3208; G09G 3/30; G09G 3/3225; G09G 3/3233; G09G 3/3241; G09G 3/3266; G09G 3/3275; G09G 3/3258
See application file for complete search history.

(56) References Cited

U.S. PATENT DOCUMENTS

| | | | |
|---|---|---|---|
| 7,002,539 B2 * | 2/2006 | Shimada | .......... 345/88 |
| 7,042,527 B2 | 5/2006 | Imai | |
| 7,170,482 B2 | 1/2007 | Okita | |
| 7,388,630 B2 * | 6/2008 | Shin et al. | .......... 349/109 |
| 8,054,282 B2 | 11/2011 | Park et al. | |

(Continued)

FOREIGN PATENT DOCUMENTS

| | | |
|---|---|---|
| JP | 2003-57641 | 2/2003 |
| JP | 2005-316092 | 11/2005 |
| JP | 2010-250193 | 11/2010 |

*Primary Examiner* — Kent Chang
*Assistant Examiner* — William Lu
(74) *Attorney, Agent, or Firm* — Lewis Roca Rothgerber Christie LLP

(57) ABSTRACT

A display apparatus includes a light source configured to generate lights having a plurality of colors, the light source configured to be driven in a field sequential color driving method; and a display panel configured to receive the lights to display an image, display the colors at a first area in a first order, and display the colors at a second area different from the first area in a second order different from the first order.

12 Claims, 15 Drawing Sheets

(56) References Cited

U.S. PATENT DOCUMENTS

| | | |
|---|---|---|
| 8,184,087 B2 | 5/2012 | Lin et al. |
| 2002/0024618 A1* | 2/2002 | Imai ............................. 348/743 |
| 2002/0113764 A1* | 8/2002 | Yamada et al. ................. 345/88 |
| 2002/0136428 A1* | 9/2002 | Sugahara et al. ............. 382/100 |
| 2006/0012614 A1* | 1/2006 | Asao et al. ................... 345/690 |
| 2007/0188676 A1* | 8/2007 | Choi et al. ..................... 349/62 |
| 2008/0266312 A1* | 10/2008 | Chen et al. ................... 345/589 |
| 2009/0115719 A1* | 5/2009 | Lin et al. ...................... 345/102 |
| 2010/0193590 A1* | 8/2010 | Komatsu ................ G06K 19/14 235/470 |
| 2011/0310133 A1 | 12/2011 | Koyama et al. |
| 2012/0001954 A1 | 1/2012 | Yamazaki et al. |
| 2012/0002127 A1 | 1/2012 | Yamazaki et al. |
| 2012/0007900 A1* | 1/2012 | Murai et al. .................. 345/690 |
| 2012/0033151 A1 | 2/2012 | Toyotaka et al. |
| 2012/0062614 A1 | 3/2012 | Miyake |
| 2012/0154696 A1 | 6/2012 | Koyama |

\* cited by examiner

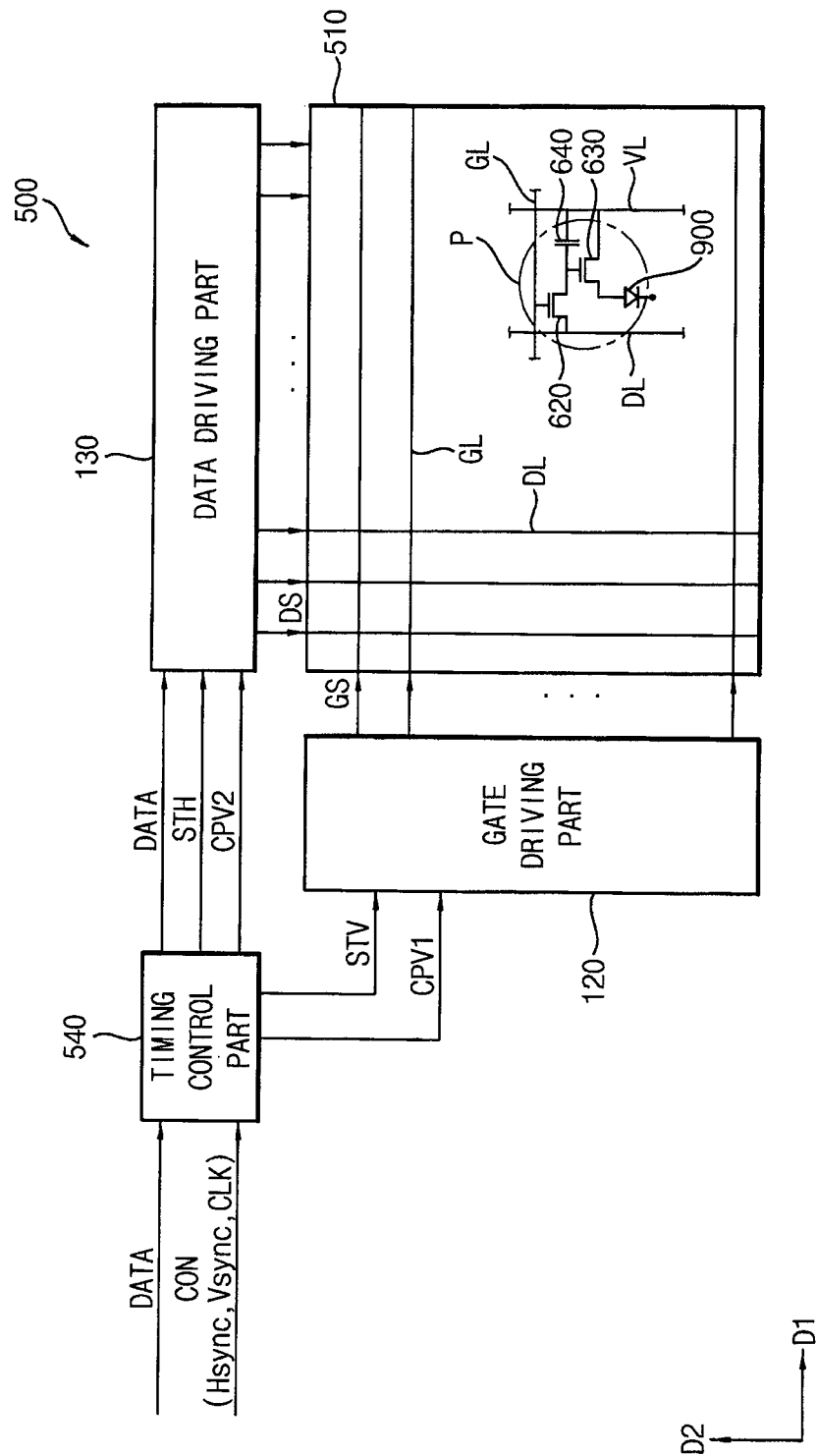

METHOD OF DISPLAYING AN IMAGE AND DISPLAY APPARATUS PERFORMING THE METHOD

CROSS-REFERENCE TO RELATED APPLICATION

This application claims priority to and the benefit of Korean Patent Application No. 10-2013-0093420, filed on Aug. 7, 2013 in the Korean Intellectual Property Office (KIPO), the content of which is herein incorporated by reference in its entirety.

BACKGROUND

1. Field

Aspects of example embodiments of the present invention relate to a method of displaying an image and a display apparatus performing the method.

2. Description of the Related Art

A display panel of a display apparatus such as a liquid crystal display apparatus may include a color filter layer at one of a lower substrate and an upper substrate. Additionally, a field sequential color driving method for sequentially driving a red color light source, a green color light source, and a blue color light source may be utilized, in order to remove the color filter layer or decrease a size of the color filter layer. However, if a display panel implements a sequential color driving method, the motion of users' eyes when they are watching images displayed on the display panel may cause a major color to be reflected in different areas of the users' a retina, which may reduce the perceived image quality by generating a dynamic color break up of the image. In addition when an obstacle is positioned between the display panel and the user, the major color may be discontinuously reflected in the retina, which may also reduce the perceived image quality by generating a static color break up of the image. Thus, the display quality of the display apparatus is deteriorated.

SUMMARY

Aspects of example embodiments of the present invention provide a method of displaying an image capable of relatively improving a display quality.

Aspects of example embodiments of the present invention also provide a display apparatus performing the above-mentioned method.

According to an example embodiment of the present invention, there is provided a method of displaying an image, the method including: driving a light source of a display panel in a field sequential color driving pattern to display the image, the light source generating light having a plurality of colors; displaying the colors at a first area of the display panel in a first order; and displaying the colors at a second area of the display panel in a second order different from the first order, the second area being different from the first area.

The image may be a watermarking.

The watermarking may be displayed at the display panel when a movable object moves between a user and the display panel.

The colors may include a first color and a second color different from the first color.

The displaying of the colors at the first area of the display panel in the first order may include: displaying the first color at the first area of the display panel during a first sub frame period of a frame period; and displaying the second color at the first area of the display panel during a second sub frame period next to the first sub frame period of the frame period.

The displaying of the colors at the second area of the display panel in the second order may include: displaying the second color at the second area of the display panel during the first sub frame period; and displaying the first color at the second area of the display panel during the second sub frame period.

The colors may further include a black color different from the first color and the second color, and the displaying of the colors at the first area of the display panel in the first order may include displaying the black color at the first area of the display panel during at least one of a last sub frame period or a first sub frame period of a frame period.

The colors may further include a black color different from the first color and the second color, and the displaying of the colors at the second area of the display panel in the second order may include displaying the black color at the second area of the display panel during at least one of a last sub frame period or a first sub frame period of a frame period.

The colors may further include a white color different from the first color and the second color, and the displaying of the colors at the first area of the display panel in the first order may include displaying the white color at the first area of the display panel during at least one of a last sub frame period or a first sub frame period of a frame period.

The colors may further include a white color different from the first color and the second color, and the displaying of the colors at the second area of the display panel in the second order may include displaying the white color at the second area of the display panel during at least one of a last sub frame period or a first sub frame period of a frame period.

The colors may further include a third color different from the first color and the second color, and the method further include: displaying the colors at a third area different from the first area and the second area of the display panel in a third order different from the first order and the second order.

The displaying of the colors at the first area of the display panel in the first order may include: displaying the first color at the first area of the display panel during a first sub frame period of a frame period; displaying the second color at the first area of the display panel during a second sub frame period next to the first sub frame period of the frame period; and displaying the third color at the first area of the display panel during a third sub frame period next to the second sub frame period of the frame period.

The displaying of the colors at the second area of the display panel in the second order may include: displaying the second color at the second area of the display panel during the first sub frame period; displaying the third color at the second area of the display panel during the second sub frame period; and displaying the first color at the second area of the display panel during the third sub frame period.

The displaying of the colors at the third area of the display panel in the third order may include: displaying the third color at the third area of the display panel during the first sub frame period; displaying the first color at the third area of the display panel during the second sub frame period; and displaying the second color at the third area of the display panel during the third sub frame period.

According to another example embodiment of the present invention, a display apparatus includes: a light source configured to generate lights having a plurality of colors, the light source configured to be driven in a field sequential color driving method; and a display panel configured to receive the lights to display an image, display the colors at a first area in a first order, and display the colors at a second area different from the first area in a second order different from the first order.

The image may be a watermarking.

The display panel may be further configured to display the image when a movable object moves between a user and the display panel.

The colors may include a black color, and the display panel may be further configured to display the black color at the first area and the second area of the display panel during at least one of a last sub frame period or a first sub frame period of a frame period.

The colors may include a white color, and the display panel may be further configured to display the white color at the first area and the second area of the display panel during at least one of a last sub frame period or a first sub frame period of a frame period.

The display panel may be an organic light emitting display panel, and the light source may include an organic light emitting diode in the organic light emitting display panel.

According to an example embodiment of the present invention, a watermarking is displayed using a static color break up generated by a field sequential color driving method, therefore static color break up may be decreased. In addition, a black color or a white color is displayed during at least one of a first sub frame period or a last sub frame period of a frame period FP, therefore dynamic color break up may be prevented or reduced. Thus, a display quality of the display apparatus may be improved.

BRIEF DESCRIPTION OF THE DRAWINGS

The above and other features and aspects of the present invention will become more apparent by describing in detailed example embodiments thereof with reference to the accompanying drawings, in which:

FIG. 15 is a block diagram illustrating a display apparatus according to still another example embodiment of the present invention.

DETAILED DESCRIPTION

Hereinafter, embodiments of the present invention will be explained in some detail with reference to the accompanying drawings.

Figure 1:
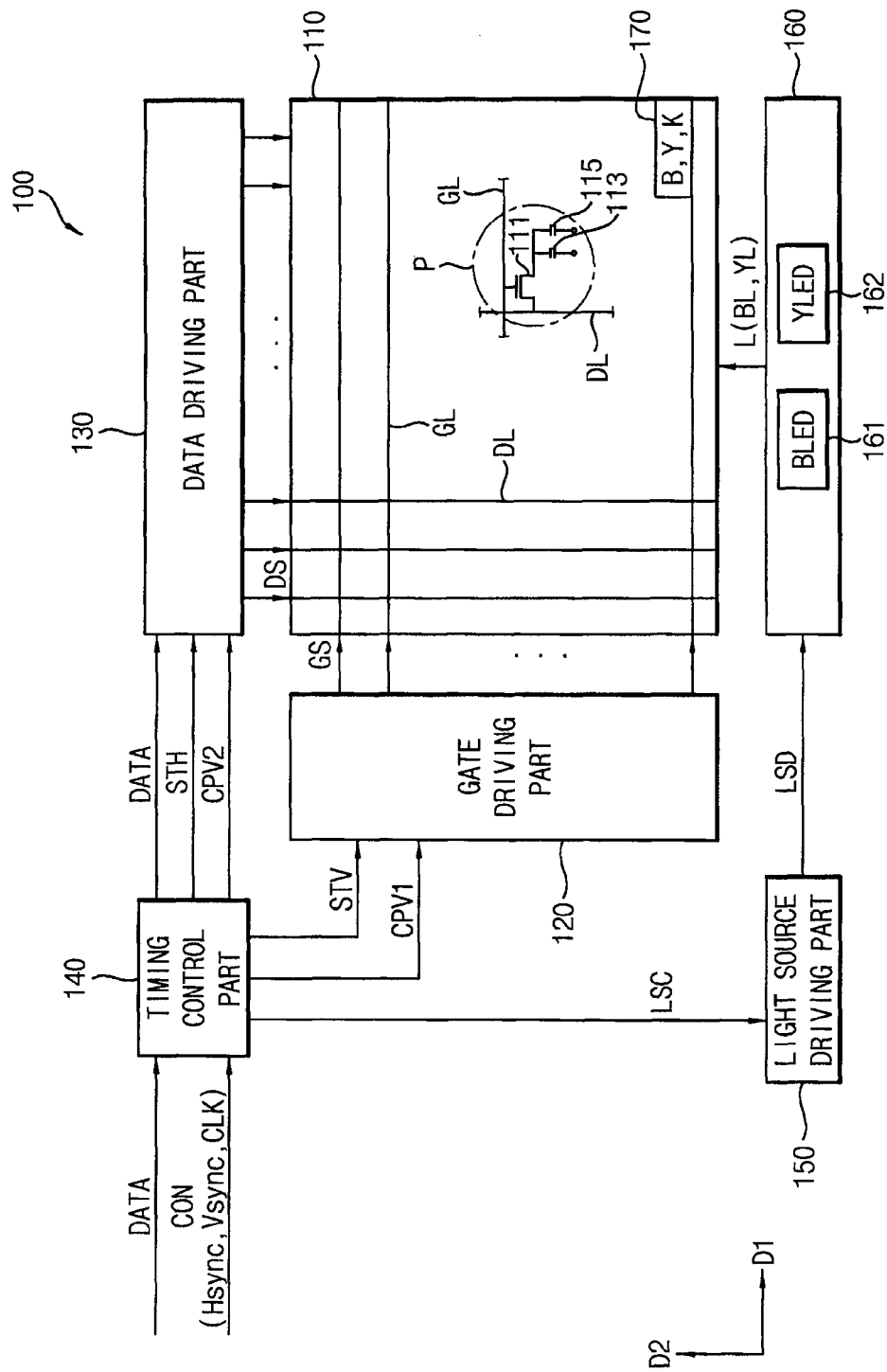
FIG. 1 is a block diagram illustrating a display apparatus according to an example embodiment of the present invention.
Figure 2:
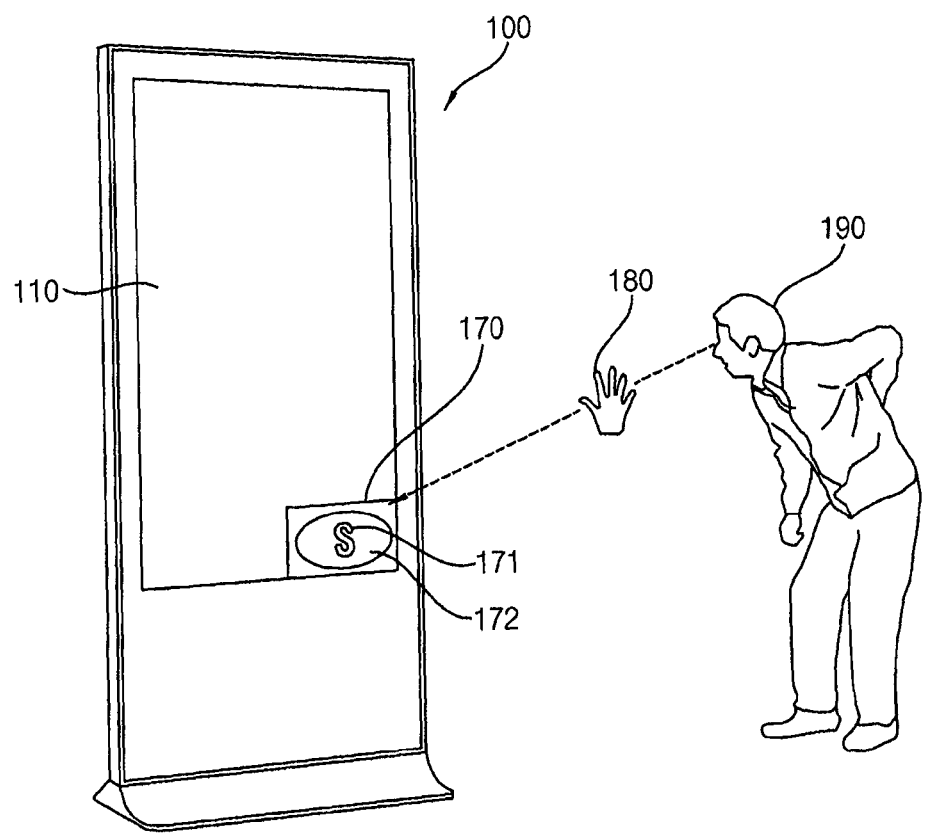
FIG. 2 is a perspective view of the display apparatus in FIG. 1.

FIG. 1 is a block diagram illustrating a display apparatus according to an example embodiment of the present invention, and FIG. 2 is a perspective view of the display apparatus in FIG. 1.

Referring to FIGS. 1 and 2, the display apparatus 100 according to an example embodiment of the present invention includes a display panel 110, a gate driving part (e.g., a gate driver) 120, a data driving part (e.g., a data driver) 130, a timing control part (e.g., a timing controller) 140, a light source driving part (e.g., a light source driver) 150 and a light source part (e.g., a light source) 160.

The display panel 110 receives a data signal DS based on an image data DATA to display an image. For example, the image data DATA may be two-dimensional plane image data. Alternatively, the image data DATA may include left-eye image data and right-eye image data for displaying a three-dimensional stereoscopic image.

The display panel 110 includes gate lines GL, data lines DL, and a plurality of pixels P. The gate line GL extends in a first direction D1 and the data line DL extends in a second direction D2 substantially perpendicular to the first direction D1. Each of the pixels P includes a thin film transistor 111 electrically coupled to the gate line GL and the data line DL, a liquid crystal capacitor 113, and a storage capacitor 115 coupled to the thin film transistor 111.

In addition, the display panel 110 includes a watermarking displaying portion 170 configured to display a watermarking. The watermarking displaying portion 170 may display a plurality of colors and include a first area 171 displaying a first color and a second area 172 displaying a second color different from the first color. Here, the first color may be a blue color B, the second color may be a yellow color Y, and the watermarking displaying portion 170 may further display a black color K. For example, the watermarking displaying portion 170 may display at least one of a logo of an advertiser company, a sponsor name, a present temperature, a present time, information related to a watching age, a security code such as a password, battery remains, etc. The watermarking may be displayed based on the image data DATA.

The display panel 110 displays the colors on the first area 171 of the watermarking displaying portion 170 in a first order and displays the colors on the second area 172 of the watermarking displaying portion 170 in a second order different from the first order.

The gate driving part 120 generates a gate signal GS in response to a gate start signal STV and a gate clock signal CPV1 provided from the timing control part 140, and outputs the gate signal GS to the gate line GL. Specifically, the gate driving part 120 increases the gate signal GS from a gate off voltage to a gate on voltage in response to activations of the gate start signal SW and the gate clock signal CPV1. In addition, the gate driving part 120 decreases the gate signal GS to the gate off voltage in response to a deactivation of the gate clock signal CPV1. For example, the gate off voltage may be in a range of about −7.5 volts (V) to about −6.5 V, and the gate on voltage may be in a range of about 28 V to about 31 V.

The data driving part 130 outputs the data signal DS based on the image data DATA to the data line DL, in response to a data start signal STH and a data clock signal CPV2 provided from the timing control part 140.

The timing control part 140 receives the image data DATA and a control signal CON from an outside component. The control signal CON may include a horizontal synchronous signal Hsync, a vertical synchronous signal Vsync and a clock signal CLK. The timing control part 140 generates the data start signal STH using the horizontal synchronous signal Hsync and outputs the data start signal STH to the data driving part 130. In addition, the timing control part 140 generates the gate start signal STV using the vertical synchronous signal Vsync and outputs the gate start signal STV to the gate driving part 120. In addition, the timing control part 140 generates the gate clock signal CLK1 and the data clock signal CLK2 using the clock signal CLK, outputs the gate clock signal CLK1 to the gate driving part 120 and outputs the data clock signal CLK2 to the data driving part 130. The timing control part 140 may further output a light source control signal LCS for controlling a driving of the light source part 160.

The light source driving part 150 outputs a light source driving signal LSD for driving the light source part 160 to the light source part 160 in response to the light source control signal LSC received from the timing control part 140.

The light source part 160 generates lights L in response to the light source driving signal LSD received from the light source driving part 150 and provides the lights L to the display panel 110. The lights L may include the colors having the first color and the second color. For example, the first color may be the blue color B and the second color may be the yellow color Y. Thus, the lights L may include a blue color light BL and a yellow color light YL, and the light source part 160 may include a blue light source 161 for emitting the blue color light BL and a yellow light source 162 for emitting the yellow color light YL. For example, each of the blue light source 161 and the yellow light source 162 may be a light emitting diode (LED).

The light source part 160 sequentially outputs the lights L to the display panel 110. Thus, the light source part 160 outputs the lights L to the display panel 110 in a field sequential color driving method or pattern. For example, the light source part 160 may sequentially provide the lights L to the watermarking displaying portion 170 of the display panel 110 to display the watermarking.

Figure 3A:
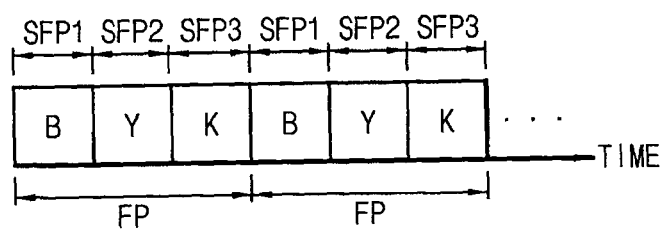
FIG. 3A is a timing diagram illustrating colors displayed on a first area of a watermarking displaying portion in FIG. 2.
Figure 3B:
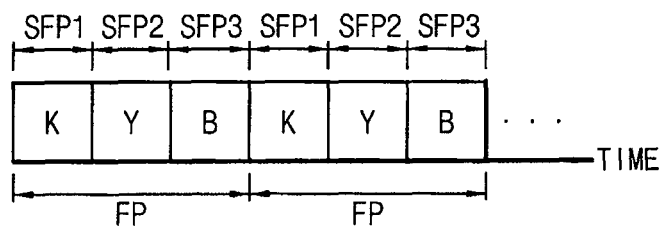
FIG. 3B is a timing diagram illustrating colors displayed on a second area of the watermarking displaying portion in FIG. 2.

FIG. 3A is a timing diagram illustrating the colors displayed on the first area 171 of the watermarking displaying portion 170 in FIG. 2, and FIG. 3B is a timing diagram illustrating the colors displayed on the second area 172 of the watermarking displaying portion 170 in FIG. 2.

Referring to FIGS. 1 to 3B, the light source part 160 provides the lights L to the display panel 110. Specifically, the light source part 160 is driven in the field sequential color driving method and the light source part 160 outputs the lights L to the display panel 110 including the watermarking displaying portion 170.

The display panel 110 displays the colors on the first area 171 in the first order and displays the colors on the second area 172 in the second order different from the first order. The colors may include the blue color B as the first color and the yellow color Y as the second color. In addition, the colors may further include the black color K as a third color different from the first color and the second color.

For example, a frame period FP includes a first sub frame period SFP1, a second sub frame period SFP2 next to the first sub frame period SFP1, and a third sub frame period SFP3 next to the second sub frame period SFP2. The display panel 110 displays the blue color B as the first color on the first area 171 of the watermarking displaying portion 170 during the first sub frame period SFP1 and displays the yellow color Y as the second color on the first area 171 of the watermarking displaying portion 170 during the second sub frame period SFP2. In addition, the display panel 110 may display the black color K on the first area 171 of the watermarking displaying portion 170 during the third sub frame period SFP3.

In the present example embodiment referring to FIG. 3A, the black color K is displayed during the third sub frame period SFP3, but it is not limited thereto. The black color K may be displayed during at least one of the first sub frame period SFP1 or a last sub frame period of the frame period FP. Thus, the black color K may be displayed during the first sub frame period SFP1. In this case, the blue color B may be displayed during the second sub frame period SFP2 and the yellow color Y may be displayed during the third sub frame period SFP3.

In addition, the display panel 110 displays the black color K on the second area 172 of the watermarking displaying portion 170 during the first sub frame period SFP1, displays the yellow color Y on the second area 172 of the watermarking displaying portion 170 during the second sub frame period SFP2 and displays the blue color B on the second area 172 of the watermarking displaying portion 170 during the third sub frame period SFP3.

In the present example embodiment referring to FIG. 3B, the black color K is displayed during the first sub frame period SFP1, but it is not limited thereto. The black color K may be displayed during the third sub frame period SFP3. In this case, the yellow color Y may be displayed during the first sub frame period SFP1l and the blue color B may be displayed during the second sub frame period SFP2.

Additionally, a movable body (or object) 180 may be located (e.g., moving) between the display panel 110 and a user 190 watching the image displayed on the display panel 110. For example, the movable body 180 may be a hand of a person or an object moving between the display panel 110 and the user 190.

The lights L are provided to the display panel 110 including the watermarking displaying portion 170 in the field sequential color driving method, the colors are provided to the first area 171 of the watermarking displaying portion 170 in the first order, the colors are provided to the second area 172 of the watermarking displaying portion 170 in the second order, the movable body 180 moves between the display panel 110 and the user 190, and thus the user 190 may watch the watermarking displayed on the watermarking displaying portion 170. Specifically, the light source part 160 is driven in the field sequential color driving method, therefore a static color break up is generated due to the movable body 180, and thus the user 190 may watch the watermarking displayed on the watermarking displaying portion 170. Thus, the user 190 may watch the watermarking when the movable body 180 moves between the display panel 110 and the user 190.

Figure 4:
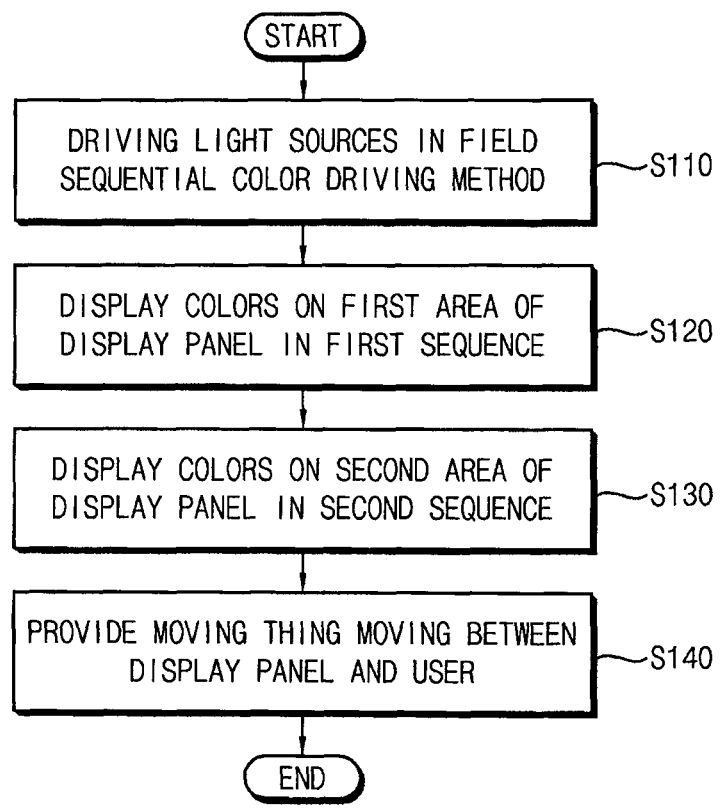
FIG. 4 is a flow chart illustrating a method of displaying an image performed by the display apparatus in FIG. 1.

FIG. 4 is a flow chart illustrating a method of displaying an image performed by the display apparatus 100 in FIG. 1.

Referring to FIGS. 1 to 4, the light source part 160 is driven in the field sequential color driving method (step S110). Specifically, the light source part 160 includes a plurality of light sources generating the lights L, the light sources are driven in the field sequential color driving method and the light source part 160 outputs the lights L to the display panel 110 including the watermarking displaying portion 170. The lights L may include a plurality of colors that are different from each other.

The colors are displayed on the first area 171 of the watermarking displaying portion 170 in the display panel 110 in the first order (step S120). Specifically, the display panel 110 displays the first color on the first area 171 of the watermarking displaying portion 170 during the first sub frame period SFP1, displays the second color on the first area 171 of the watermarking displaying portion 170 during the second sub frame period SFP2 and displays the black color K (e.g., a third color) on the first area 171 of the watermarking displaying portion 170 during the third sub frame period SFP3. For example, the first color may be the blue color B and the second color may be the yellow color Y.

The colors are displayed on the second area 172 of the watermarking displaying portion 170 in the display panel 110 in the second order (step S130). Specifically, the display panel 110 displays the black color K on the second area 172 of the watermarking displaying portion 170 during the first sub frame period SFP1, displays the second color on the second area 172 of the watermarking displaying portion 170 during the second sub frame period SFP2, and displays the first color on the second area 172 of the watermarking displaying portion 170 during the third sub frame period SFP3.

The movable body 180 moving between the display panel 110 and the user 190 is provided (step S140). The movable body 180 moving between the display panel 110 and the user 190 is provided, and thus the user 190 may watch the watermarking displayed on the watermarking displaying portion 170. Specifically, the light source part 160 is driven in the field sequential color driving method, therefore the static color break up is generated due to the movable body 180, and thus the user may watch the watermarking displayed on the watermarking displaying portion 170.

According to the present example embodiment, the watermarking is displayed using the static color break up generated by the field sequential color driving method, therefore a problem of the static color break up may be decreased. In addition, the black color K is displayed during at least one of the first sub frame period SFP1 or the last sub frame period of the frame period FP, therefore a generation of a dynamic color break up may be prevented or reduced. Thus, a display quality of the display apparatus 100 may be improved.

Figure 5:
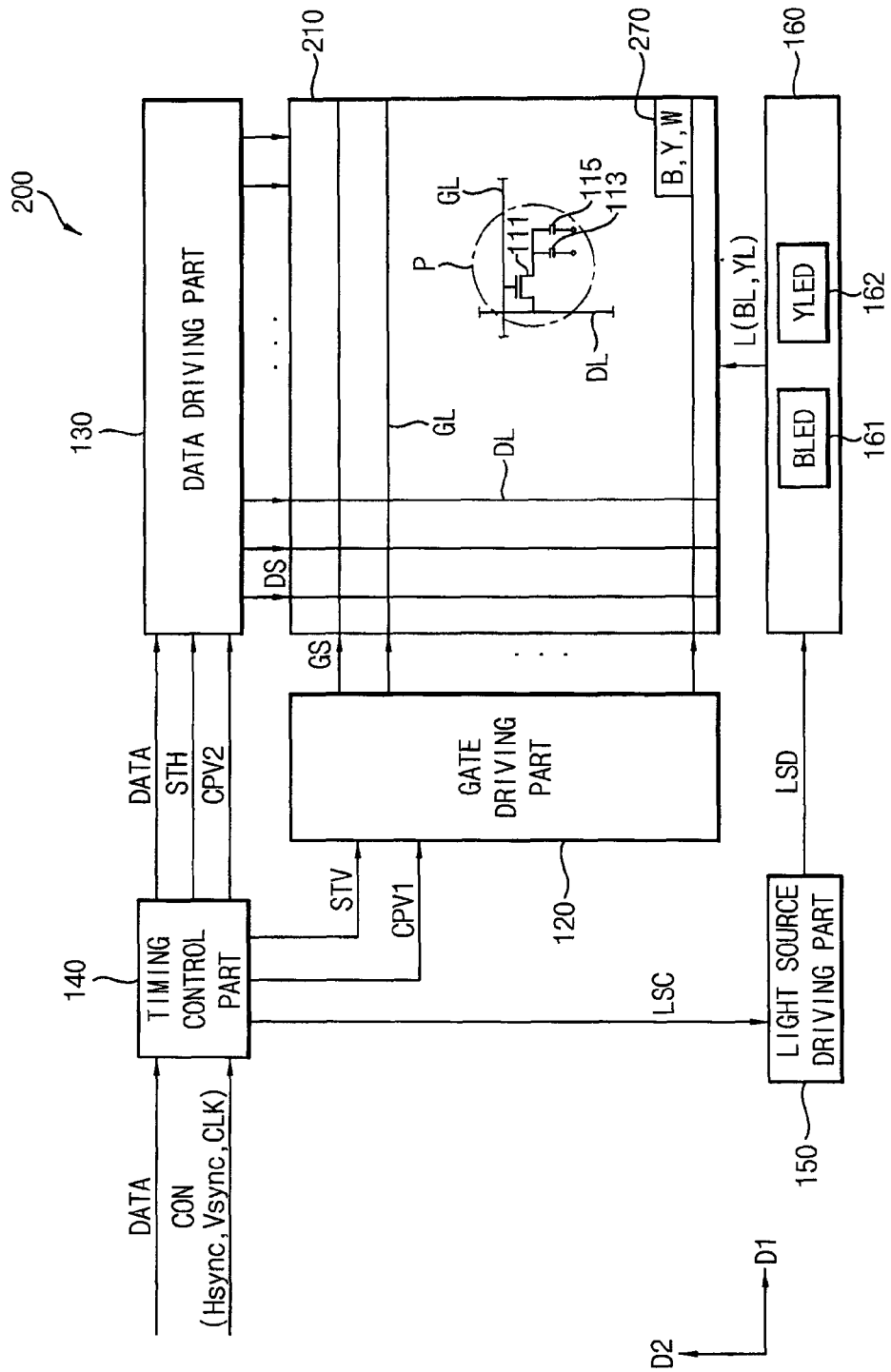
FIG. 5 is a block diagram illustrating a display apparatus according to another example embodiment of the present invention.
Figure 6:
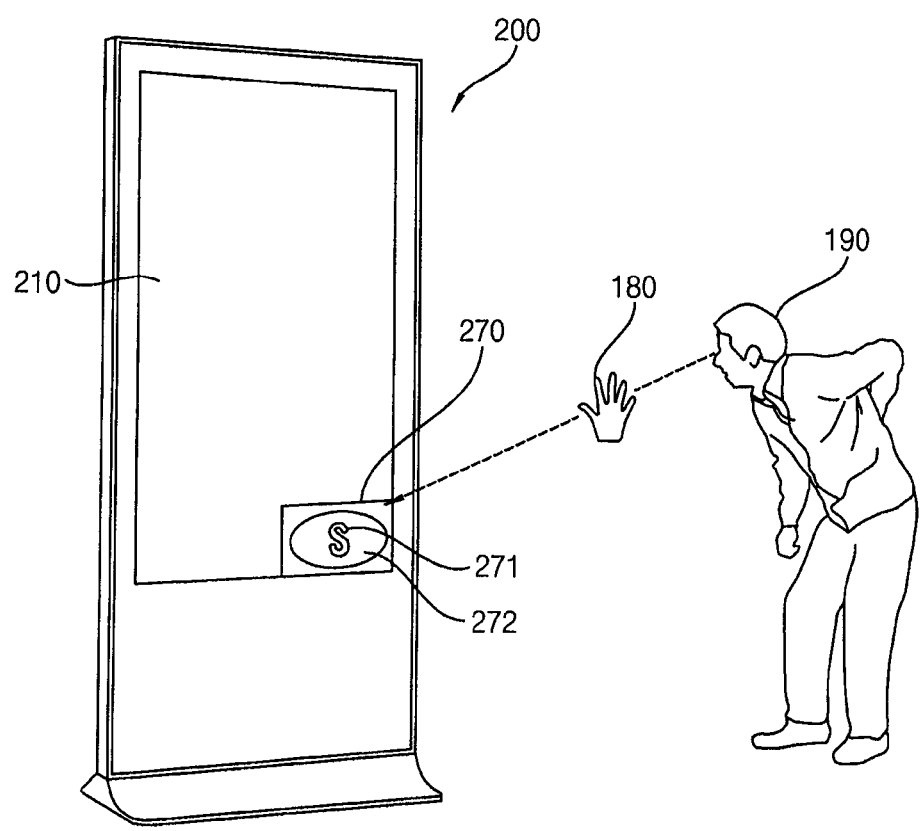
FIG. 6 is a perspective view of the display apparatus in FIG. 5.

FIG. 5 is a block diagram illustrating a display apparatus according to another example embodiment of the present invention, and FIG. 6 is a perspective view of the display apparatus in FIG. 5.

The display apparatus 200 according to the present example embodiment may be substantially the same as the display apparatus 100 according to the previous example embodiment illustrated in FIGS. 1 and 2 except for a display panel 210. Thus, the same reference numerals will be used to refer to same or like parts as those described in the previous example embodiment and any further repetitive explanation concerning the above elements will be omitted.

Referring to FIGS. 5 and 6, the display apparatus 200 according to the present example embodiment includes the display panel 210, the gate driving part 120, the data driving part 130, the timing control part 140, the light source driving part 150 and the light source part 160.

The display panel 210 receives the data signal DS based on the image data DATA to display an image. In addition, the display panel 210 includes a watermarking displaying portion 270 displaying a watermarking. The watermarking displaying portion 270 may display a plurality of colors and include a first area 271 displaying a first color and a second area 272 displaying a second color different from the first color. Here, the first color may be a blue color B, the second color may be a yellow color Y, and the watermarking displaying portion 270 may further display a white color W.

The display panel 210 displays the colors on the first area 271 of the watermarking displaying portion 270 in a first order and displays the colors on the second area 272 of the watermarking displaying portion 270 in a second order different from the first order.

The light source part 160 sequentially outputs the lights L to the display panel 110. Thus, the light source part 160 outputs the lights L to the display panel 110 in a field sequential color driving method or pattern. For example, the light source part 160 may sequentially provide the lights L to the watermarking displaying portion 270 of the display panel 210 to display the watermarking.

Figure 7A:
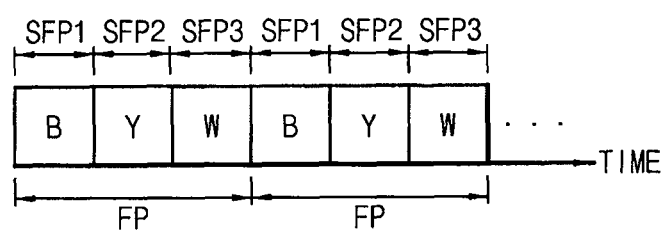
FIG. 7A is a timing diagram illustrating colors displayed on a first area of a watermarking displaying portion in FIG. 6.
Figure 7B:
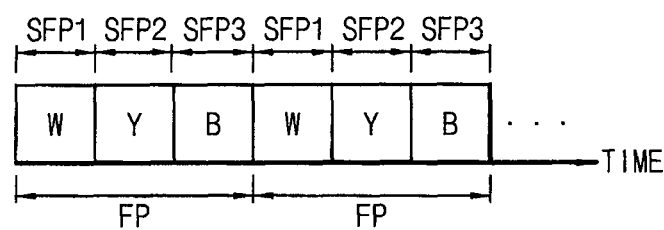
FIG. 7B is a timing diagram illustrating colors displayed on a second area of the watermarking displaying portion in FIG. 6.

FIG. 7A is a timing diagram illustrating the colors displayed on the first area 271 of the watermarking displaying portion 270 in FIG. 6, and FIG. 7B is a timing diagram illustrating the colors displayed on the second area 272 of the watermarking displaying portion 270 in FIG. 6.

Referring to FIGS. 1 to 7B, the light source part 160 provides the lights L to the display panel 210. Specifically, the light source part 160 is driven in the field sequential color driving method and the light source part 160 outputs the lights L to the display panel 210 including the watermarking displaying portion 270.

The display panel 210 displays the colors on the first area 271 in the first order and displays the colors on the second area 272 in the second order different from the first order. The colors may include the blue color B as the first color and the yellow color Y as the second color. In addition, the colors may further include the white color W (e.g., a third color), different from the first color and the second color.

Specifically, a frame period FP includes a first sub frame period SFP1, a second sub frame period SFP2 next to the first sub frame period SFP1, and a third sub frame period SFP3 next to the second sub frame period SFP2. The display panel 210 displays the blue color B as the first color on the first area 271 of the watermarking displaying portion 270 during the first sub frame period SFP1 and displays the yellow color Y as the second color on the first area 271 of the watermarking displaying portion 270 during the second sub frame period SFP2. In addition, the display panel 210 may display the black color K on the first area 271 of the watermarking displaying portion 270 during the third sub frame period SFP3.

In the present example embodiment referring to FIG. 7A, the white color W is displayed during the third sub frame period SFP3, but it is not limited thereto. The white color W may be displayed during at least one of a first sub frame period SFP1 or a last sub frame period of the frame period FP. Thus, the white color W may be displayed during the first sub frame period SFP1. In this case, the blue color B may be displayed during the second sub frame period SFP2 and the yellow color Y may be displayed during the third sub frame period SFP3.

In addition, the display panel 210 displays the white color W on the second area 272 of the watermarking displaying portion 270 during the first sub frame period SFP1, displays the yellow color Y on the second area 272 of the watermarking displaying portion 270 during the second sub frame period SFP2 and displays the blue color B on the second area 272 of the watermarking displaying portion 270 during the third sub frame period SFP3.

In the present example embodiment referring to FIG. 7B, the white color W is displayed during the first sub frame period SFP1, but it is not limited thereto. The white color W may be displayed during the third sub frame period SFP3. In this case, the yellow color Y may be displayed during the first sub frame period SFP1 and the blue color B may be displayed during the second sub frame period SFP2.

The display apparatus 200 may further include a movable body 180 moving between the display panel 210 and the user 190 watching the image displayed on the display panel 210. For example, the movable body 180 may be a hand of a person or an object moving between the display panel 210 and the user 190.

The lights L are provided to the display panel 210 including the watermarking displaying portion 270 in the field sequential color driving method, the colors are provided to the first area 271 of the watermarking displaying portion 270 in the first order, the colors are provided to the second area 272 of the watermarking displaying portion 270 in the second order, the movable body 180 moves between the display panel 210 and the user 190, and thus the user 190 may watch the watermarking displayed on the watermarking displaying portion 270. Specifically, the light source part 160 is driven in the field sequential color driving method, therefore a static color break up is generated due to the movable body 180, and thus the user 190 may watch the watermarking displayed on the watermarking displaying portion 270. Thus, the user 190 may watch the watermarking when the movable body 180 moves between the display panel 110 and the user 190.

A method of displaying an image performed by the display apparatus 200 of FIGS. 5 and 6 is substantially the same as the method of displaying an image of FIG. 4 except for using the white color W instead of the black color K. Thus, repeated description concerning the method of displaying an image performed by the display apparatus 200 is omitted.

According to the present example embodiment, the watermarking is displayed using the static color break up generated by the field sequential color driving method, therefore a problem of the static color break up may be decreased. In addition, the white color W is displayed during at least one of the first sub frame period SFP1 or the last sub frame period of the frame period FP, therefore a generation of a dynamic color break up may be prevented or reduced. Thus, a display quality of the display apparatus 200 may be improved.

Figure 8:
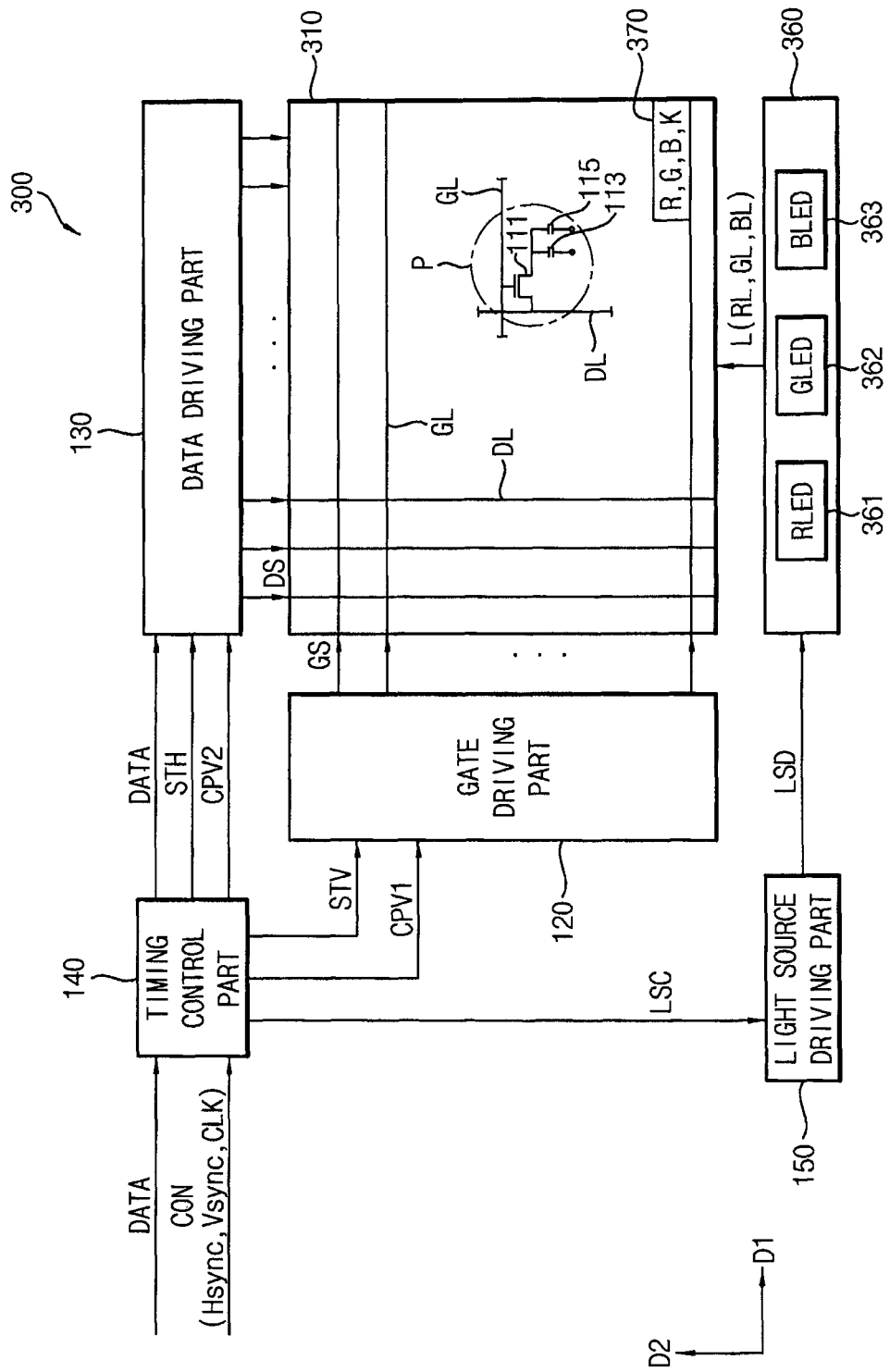
FIG. 8 is a block diagram illustrating a display apparatus according to still another example embodiment of the present invention.
Figure 9:
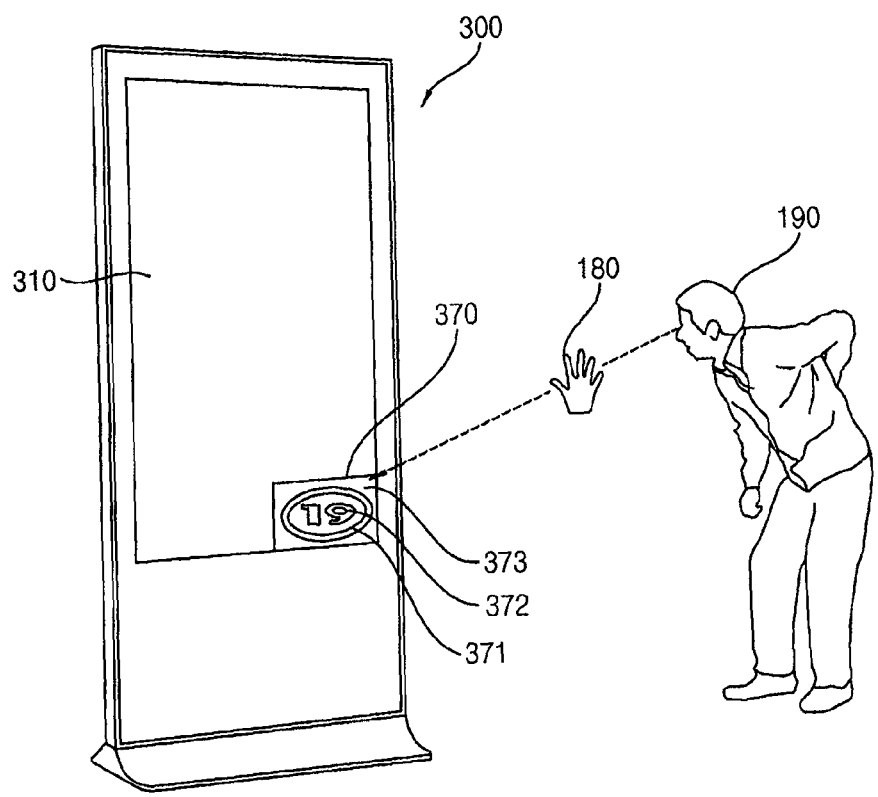
FIG. 9 is a perspective view of the display apparatus in FIG. 8.

FIG. 8 is a block diagram illustrating a display apparatus according to still another example embodiment of the present invention, and FIG. 9 is a perspective view of the display apparatus in FIG. 8.

The display apparatus 300 according to the present example embodiment may be substantially the same as the display apparatus 100 according to the previous example embodiment illustrated in FIGS. 1 and 2 except for a display panel 310 and a light source part 360. Thus, the same reference numerals will be used to refer to same or like parts as those described in the previous example embodiment and any further repetitive explanation concerning the above elements will be omitted.

Referring to FIGS. 8 and 9, the display apparatus 300 according to the present example embodiment includes the display panel 310, the gate driving part 120, the data driving part 130, the timing control part 140, the light source driving part 150 and the light source part 360.

The display panel 310 receives the data signal DS based on the image data DATA to display an image. In addition, the display panel 310 includes a watermarking displaying portion 370 displaying a watermarking. The watermarking displaying portion 370 may display a plurality of colors and include a first area 371 displaying a first color, a second area 372 displaying a second color different from the first color, and a third area 373 displaying a third color different from the first color and the second color. Here, the first color may be a red color R, the second color may be a green color G, the third color may be a blue color B, and the watermarking displaying portion 370 may further display a black color K.

The display panel 310 displays the colors on the first area 371 of the watermarking displaying portion 370 in a first order, displays the colors on the second area 372 of the watermarking displaying portion 370 in a second order different from the first order, and displays the colors on the third area 372 of the watermarking displaying portion 370 in a third order different from the first order and the second order.

The light source part 360 generates lights L in response to the light source driving signal LSD received from the light source driving part 150 and provides the lights L to the display panel 310. The lights L may include the colors having the first color, the second color, and the third color. For example, the first color may be the red color R, the second color may be the green color G and the third color may be the blue color B. Thus, the lights L may include a red color light RL, a green color light GL, and a blue color light BL, and the light source part 360 may include a red light source 361 emitting the red light RL, a green light source 362 emitting the green light GL and a blue light source 363 emitting the blue color light BL. For example, each of the red light source 361, the green light source 362 and the blue light source 363 may be a light emitting diode (LED).

The light source part 360 sequentially outputs the lights L to the display panel 310. Thus, the light source part 360 outputs the lights L to the display panel 310 in a field sequential color driving method. For example, the light source part 360 may sequentially provide the lights L to the watermarking displaying portion 370 of the display panel 310 to display the watermarking.

Figure 10A:
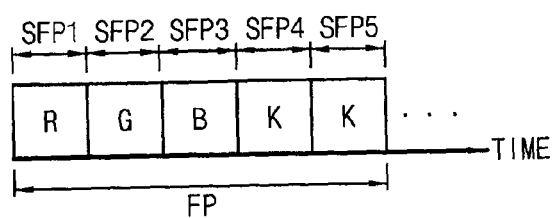
FIG. 10A is a timing diagram illustrating colors displayed on a first area of a watermarking displaying portion in FIG. 9.
Figure 10B:
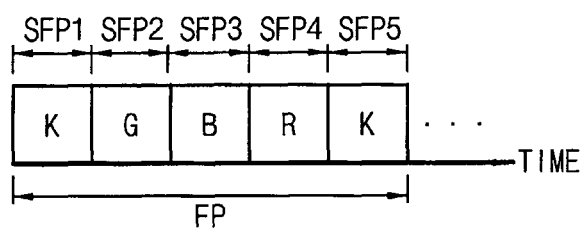
FIG. 10B is a timing diagram illustrating colors displayed on a second area of the watermarking displaying portion in FIG. 9.
Figure 10C:
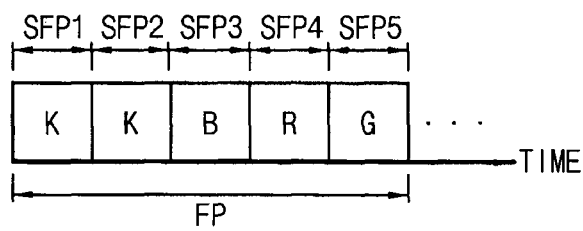
FIG. 10C is a timing diagram illustrating colors displayed on a third area of the watermarking displaying portion in FIG. 9.

FIG. 10A is a timing diagram illustrating the colors displayed on the first area 371 of the watermarking displaying portion 370 in FIG. 9, FIG. 10B is a timing diagram illustrating the colors displayed on the second area 372 of the watermarking displaying portion 370 in FIG. 9, and FIG. 10C is a timing diagram illustrating the colors displayed on the third area 373 of the watermarking displaying portion 370 in FIG. 9.

Referring to FIGS. 8 to 10C, the light source part 360 provides the lights L to the display panel 310. Specifically, the light source part 360 is driven in the field sequential color driving method and the light source part 360 outputs the lights L to the display panel 310 including the watermarking displaying portion 370.

The display panel 310 displays the colors on the first area 371 in the first order, displays the colors on the second area 372 in the second order different from the first order, and displays the colors on the third area 373 in the third order different from the first order and the second order. The colors may include the red color R as the first color, the green color G as the second color, and the blue color B as the third color. In addition, the colors may further include the black color K different from the first color, the second color and the third color.

A frame period FP may include a first sub frame period SFP1, a second sub frame period SFP2 next to the first sub frame period SFP1, a third sub frame period SFP3 next to the second sub frame period SFP2, a fourth sub frame period SFP4 next to the third sub frame period SFP3, and a fifth sub frame period SFP5 next to the fourth sub frame period SFP4. The display panel 310 displays the red color R as the first color on the first area 371 of the watermarking displaying portion 370 during the first sub frame period SFP1, displays the green color G as the second color on the first area 371 of the watermarking displaying portion 370 during the second sub frame period SFP2, displays the blue color B as the third color on the first area 371 of the watermarking displaying portion 370 during the third sub frame period SFP3, and displays the black color K on the first area 371 of the watermarking displaying portion 370 during the fourth sub frame period SFP4 and the fifth sub frame period SFP5.

In the present example embodiment referring to FIG. 10A, the black color K is displayed during the fourth sub frame period SFP4 and the fifth sub frame period SFP5, but it is not limited thereto. The black color K may be displayed during at least one of the first sub frame period SFP1 or a last sub frame period of the frame period FP.

In addition, the display panel 310 displays the black color K on the second area 372 of the watermarking displaying portion 370 during the first sub frame period SFP1, displays the green color G as the second color on the second area 372 of the watermarking displaying portion 370 during the second sub frame period SFP2, displays the blue color B as the third color on the second area 372 of the watermarking displaying portion 370 during the third sub frame period SFP3, displays the red color R as the first color on the second area 372 of the watermarking displaying portion 370 during the fourth sub frame period SFP4, and displays the black color K on the second area 372 of the watermarking displaying portion 370 during the fifth sub frame period SFP5.

In the present example embodiment referring to FIG. 10B, the black color K is displayed during the first sub frame period SFP1 and the fifth sub frame period SFP5, but it is not limited thereto. The black color K may be displayed during at least one of the first sub frame period SFP1 or the last sub frame period of the frame period FP.

In addition, the display panel 310 displays the black color K on the third area 373 of the watermarking displaying portion 370 during the first sub frame period SFP1 and the second sub frame period SFP2, displays the blue color B as the third color on the third area 373 of the watermarking displaying portion 370 during the third sub frame period SFP3, displays the red color R as the first color on the third area 373 of the watermarking displaying portion 370 during the fourth sub frame period SFP4 and displays the green color G as the second color on the third area 373 of the watermarking displaying portion 370 during the fifth sub frame period SFP5.

In the present example embodiment referring to FIG. 10C, the black color K is displayed during the first sub frame period SFP1 and the second sub frame period SFP2, but it is not limited thereto. The black color K may be displayed during at least one of the first sub frame period SFP1 or the last sub frame period of the frame period FP.

The movable body 180 may move between the display panel 310 and the user 190 watching the image displayed on the display panel 310. For example, the movable body 180 may be a hand of a person or an object moving between the display panel 310 and the user 190.

The lights L are provided to the display panel 310 including the watermarking displaying portion 370 in the field sequential color driving method, the colors are provided to the first area 371 of the watermarking displaying portion 370 in the first order, the colors are provided to the second area 372 of the watermarking displaying portion 370 in the second order, the colors are provided to the third area 373 of the watermarking displaying portion 370 in the third order, the movable body 180 moves between the display panel 310 and the user 190, and thus the user 190 may watch the watermarking displayed on the watermarking displaying portion 370. Specifically, the light source part 360 is driven in the field sequential color driving method, therefore a static color break up is generated due to the movable body 180, and thus the user 190 may watch the watermarking displayed on the watermarking displaying portion 370. Thus, the user 190 may watch the watermarking when the movable body 180 moves between the display panel 310 and the user 190.

Figure 11:
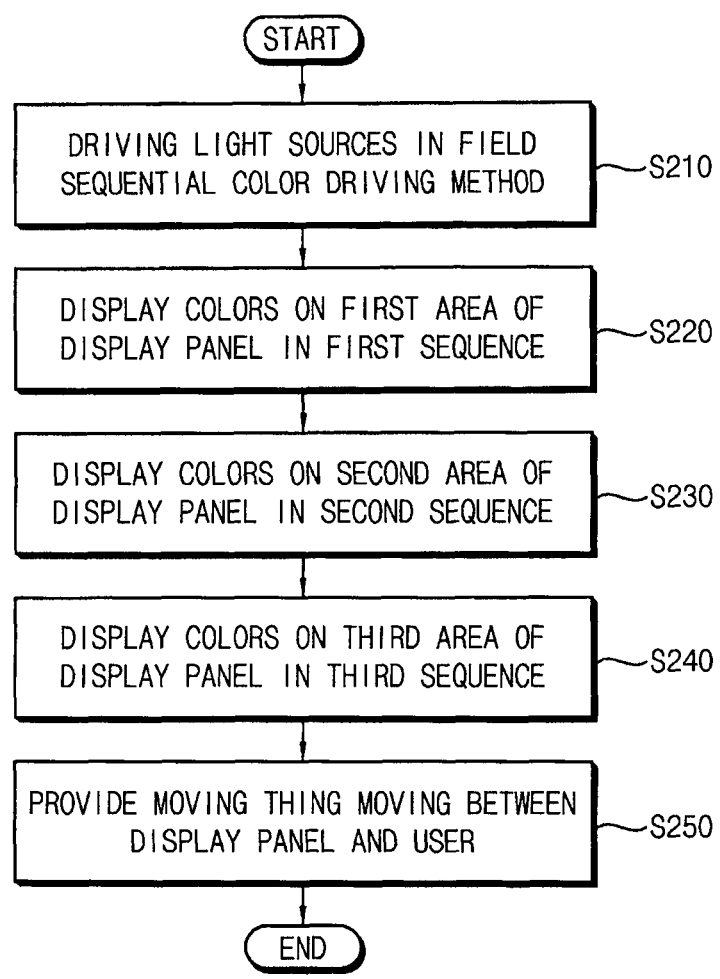
FIG. 11 is a flow chart illustrating a method of displaying an image performed by the display apparatus in FIG. 8.

FIG. 11 is a flow chart illustrating a method of displaying an image performed by the display apparatus 300 in FIG. 8.

Referring to FIGS. 8 to 11, the light source part 360 is driven in the field sequential color driving method (step S210). Specifically, the light source part 360 includes a plurality of light sources generating the lights L, the light sources are driven in the field sequential color driving method, and the light source part 360 outputs the lights L to the display panel 310 including the watermarking displaying portion 370. The lights L may include the colors different from each other.

The colors are displayed on the first area 371 of the watermarking displaying portion 370 in the display panel 310 in the first order (step S220). Specifically, the display panel 310 displays the first color on the first area 371 of the watermarking displaying portion 370 during the first sub frame period SFP1, displays the second color on the first area 371 of the watermarking displaying portion 370 during the second sub frame period SFP2, displays the third color on the first area 371 of the watermarking displaying portion 370 during the third sub frame period SFP3, and displays the black color K on the first area 371 of the watermarking displaying portion 370 during the fourth sub frame period SFP4 and the fifth sub frame period SFP5. For example, the first color may be the red color R, the second color may be the green color G, and the third color may be the blue color B.

The colors are displayed on the second area 372 of the watermarking displaying portion 370 in the display panel 310 in the second order (step S230). Specifically, the display panel 310 displays the black color K on the second area 372 of the watermarking displaying portion 370 during the first sub frame period SFP1, displays the second color on the second area 372 of the watermarking displaying portion 370 during the second sub frame period SFP2, displays the third color on the second area 372 of the watermarking displaying portion 370 during the third sub frame period SFP3, displays the first color on the second area 372 of the watermarking displaying portion 370 during the fourth sub frame period SFP4, and displays the black color K on the second area 372 of the watermarking displaying portion 370 during the fifth sub frame period SFP5.

The colors are displayed on the third area 373 of the watermarking displaying portion 370 in the display panel 310 in the third order (step S240). Specifically, the display panel 310 displays the black color K on the third area 373 of the watermarking displaying portion 370 during the first sub frame period SFP1 and the second sub frame period SFP2, displays the third color on the third area 373 of the watermarking displaying portion 370 during the third sub frame period SFP3, displays the first color on the third area 373 of the watermarking displaying portion 370 during the fourth sub frame period SFP4, and displays the second color on the third area 373 of the watermarking displaying portion 370 during the fifth sub frame period SFP5.

The movable body 180 moving between the display panel 310 and the user 190 is provided (step S250). The movable body 180 moving between the display panel 310 and the user 190 is provided, and thus the user 190 may watch the watermarking displayed on the watermarking displaying portion 370. Specifically, the light source part 360 is driven in the field sequential color driving method, therefore the static color break up is generated due to the movable body 180, and thus the user may watch the watermarking displayed on the watermarking displaying portion 370.

According to the present example embodiment, the watermarking is displayed using the static color break up generated by the field sequential color driving method, therefore a problem of the static color break up may be decreased. In addition, the black color K is displayed during at least one of the first sub frame period SFP1 or the last sub frame period of the frame period FP, therefore a generation of a dynamic color break up may be prevented or reduced. Thus, a display quality of the display apparatus 300 may be improved.

Figure 12:
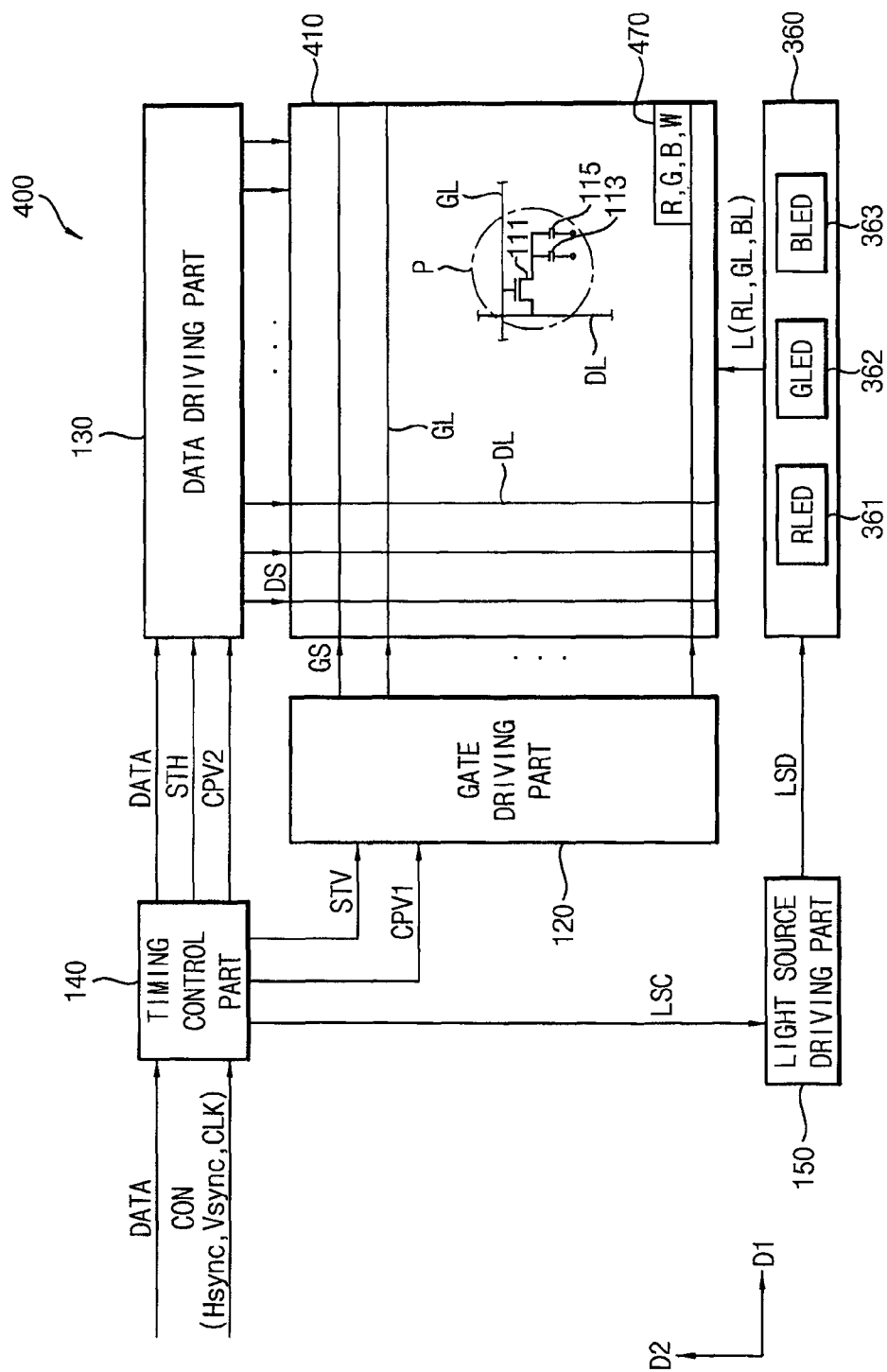
FIG. 12 is a block diagram illustrating a display apparatus according to still another example embodiment of the present invention.
Figure 13:
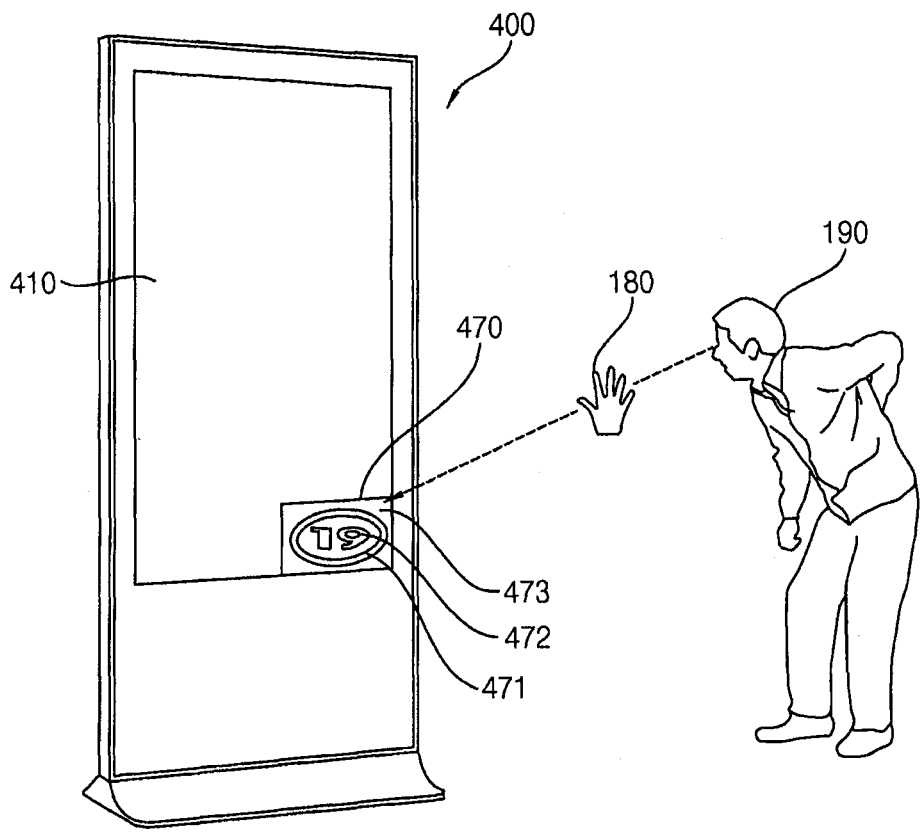
FIG. 13 is a perspective view of the display apparatus in FIG. 12.

FIG. 12 is a block diagram illustrating a display apparatus according to still another example embodiment of the present invention, and FIG. 13 is a perspective view of the display apparatus in FIG. 12.

The display apparatus 400 according to the present example embodiment may be substantially the same as the display apparatus 300 according to the previous example embodiment illustrated in FIGS. 8 and 9 except for a display panel 410. Thus, the same reference numerals will be used to refer to same or like parts as those described in the previous example embodiment and any further repetitive explanation concerning the above elements will be omitted.

Referring to FIGS. 12 and 13, the display apparatus 400 according to the present example embodiment includes the display panel 410, the gate driving part 120, the data driving part 130, the timing control part 140, the light source driving part 150, and the light source part 360.

The display panel 410 receives the data signal DS based on the image data DATA to display an image. In addition, the display panel 410 includes a watermarking displaying portion 470 displaying a watermarking. The watermarking displaying portion 470 may display a plurality of colors and include a first area 471 displaying a first color, a second area 472 displaying a second color different from the first color, and a third area 473 displaying a third color different from the first color and the second color. Here, the first color may be a red color R, the second color may be a green color G, the third color may be a blue color B, and the watermarking displaying portion 470 may further display a white color W.

The display panel 410 displays the colors on the first area 471 of the watermarking displaying portion 470 in a first order, displays the colors on the second area 472 of the watermarking displaying portion 470 in a second order different from the first order, and displays the colors on the third area 472 of the watermarking displaying portion 470 in a third order different from the first order and the second order.

The light source part 360 sequentially outputs the lights L to the display panel 410. Thus, the light source part 360 outputs the lights L to the display panel 410 in a field sequential color driving method. For example, the light source part 360 may sequentially provide the lights L to the watermarking displaying portion 470 of the display panel 410 to display the watermarking.

Figure 14A:
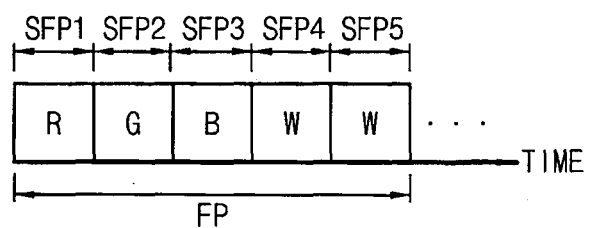
FIG. 14A is a timing diagram illustrating colors displayed on a first area of a watermarking displaying portion in FIG. 13.
Figure 14B:
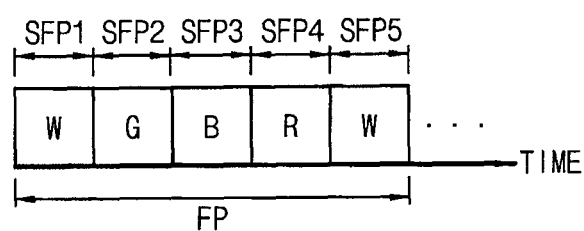
FIG. 14B is a timing diagram illustrating colors displayed on a second area of the watermarking displaying portion in FIG. 13.
Figure 14C:
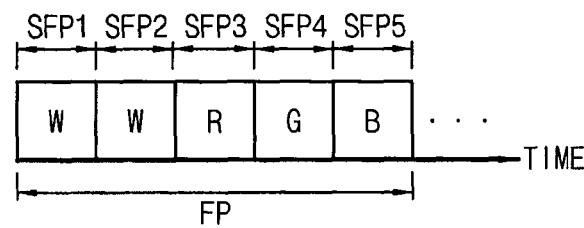
FIG. 14C is a timing diagram illustrating colors displayed on a third area of the watermarking displaying portion in FIG. 13.

FIG. 14A is a timing diagram illustrating the colors displayed on the first area 471 of the watermarking displaying portion 470 in FIG. 13, FIG. 14B is a timing diagram illustrating the colors displayed on the second area 472 of the watermarking displaying portion 470 in FIG. 13, and FIG. 14C is a timing diagram illustrating the colors displayed on the third area 473 of the watermarking displaying portion 470 in FIG. 13.

Referring to FIGS. 12 to 14C, the light source part 360 provides the lights L to the display panel 410. Specifically, the light source part 360 is driven in the field sequential color driving method and the light source part 360 outputs the lights L to the display panel 410 including the watermarking displaying portion 470.

The display panel 410 displays the colors on the first area 471 in the first order, displays the colors on the second area 472 in the second order different from the first order, and displays the colors on the third area 473 in the third order different from the first order and the second order. The colors may include the red color R as the first color, the green color G as the second color, and the blue color B as the third color. In addition, the colors may further include the white color W different from the first color, the second color, and the third color.

A frame period FP includes a first sub frame period SFP1, a second sub frame period SFP2 next to the first sub frame period SFP1, a third sub frame period SFP3 next to the second sub frame period SFP2, a fourth sub frame period SFP4 next to the third sub frame period SFP3, and a fifth sub frame period SFP5 next to the fourth sub frame period SFP4. The display panel 410 displays the red color R as the first color on the first area 471 of the watermarking displaying portion 470 during the first sub frame period SFP1, displays the green color G as the second color on the first area 471 of the watermarking displaying portion 470 during the second sub frame period SFP2, displays the blue color B as the third color on the first area 471 of the watermarking displaying portion 470 during the third sub frame period SFP3 and displays the white color W on the first area 471 of the watermarking displaying portion 470 during the fourth sub frame period SFP4 and the fifth sub frame period SFP5.

In the present example embodiment referring to FIG. 14A, the white color W is displayed during the fourth sub frame period SFP4 and the fifth sub frame period SFP5, but it is not limited thereto. The white color W may be displayed during at least one of the first sub frame period SFP1 or a last sub frame period of the frame period FP.

In addition, the display panel 410 displays the white color W on the second area 472 of the watermarking displaying portion 470 during the first sub frame period SFP1, displays the green color G as the second color on the second area 472 of the watermarking displaying portion 470 during the second sub frame period SFP2, displays the blue color B as the third color on the second area 472 of the watermarking displaying portion 470 during the third sub frame period SFP3, displays the red color R as the first color on the second area 472 of the watermarking displaying portion 470 during the fourth sub frame period SFP4, and displays the white color W on the second area 472 of the watermarking displaying portion 470 during the fifth sub frame period SFP5.

In the present example embodiment referring to FIG. 14B, the white color W is displayed during the first sub frame period SFP1 and the fifth sub frame period SFP5, but it is not limited thereto. The white color W may be displayed during at least one of the first sub frame period SFP1 or the last sub frame period of the frame period FP.

In addition, the display panel 410 displays the white color W on the third area 473 of the watermarking displaying portion 470 during the first sub frame period SFP1 and the second sub frame period SFP2, displays the blue color B as the third color on the third area 473 of the watermarking displaying portion 470 during the third sub frame period SFP3, displays the red color R as the first color on the third area 473 of the watermarking displaying portion 470 during the fourth sub frame period SFP4 and displays the green color G as the second color on the third area 473 of the watermarking displaying portion 470 during the fifth sub frame period SFP5.

In the present example embodiment referring to FIG. 14C, the white color W is displayed during the first sub frame period SFP1 and the second sub frame period SFP2, but it is not limited thereto. The white color W may be displayed during at least one of the first sub frame period SFP1 or the last sub frame period of the frame period FP.

The movable body 180 may move between the display panel 410 and the user 190 watching the image displayed on the display panel 410. For example, the movable body 180 may be a hand of a person or an object moving between the display panel 410 and the user 190.

The lights L are provided to the display panel 410 including the watermarking displaying portion 470 in the field sequential color driving method, the colors are provided to the first area 471 of the watermarking displaying portion 470 in the first order, the colors are provided to the second area 472 of the watermarking displaying portion 470 in the second order, the colors are provided to the third area 473 of the watermarking displaying portion 470 in the third order, the movable body 180 moves between the display panel 410 and the user 190, and thus the user 190 may watch the watermarking displayed on the watermarking displaying portion 470. Specifically, the light source part 360 is driven in the field sequential color driving method, therefore a static color break up is generated due to the movable body 180, and thus the user 190 may watch the watermarking displayed on the watermarking displaying portion 470. Thus, the user 190 may watch the watermarking when the movable body 180 moves between the display panel 410 and the user 190.

A method of displaying an image performed by the display apparatus 400 of FIGS. 12 and 13 is substantially the same as the method of displaying an image of FIG. 11 except for using the white color W instead of the black color K. Thus, repeated description concerning the method of displaying an image performed by the display apparatus 400 is omitted.

According to the present example embodiment, the watermarking is displayed using the static color break up generated by the field sequential color driving method, therefore a problem of the static color break up may be decreased. In addition, the white color W is displayed during at least one of the first sub frame period SFP1 or the last sub frame period of the frame period FP, therefore a generation of a dynamic color break up may be prevented or reduced. Thus, a display quality of the display apparatus 400 may be improved.

FIG. 15 is a block diagram illustrating a display apparatus according to still another example embodiment of the present invention.

The display apparatus 500 according to the present example embodiment may be substantially the same as the display apparatus 300 according to the previous example embodiment illustrated in FIGS. 8 and 9 except for the display panel 310, the timing control part 140, the light source driving part 150, and the light source part 360. Thus, the same reference numerals will be used to refer to same or like parts as those described in the previous example embodiment and any further repetitive explanation concerning the above elements will be omitted.

Referring to FIG. 15, the display apparatus 500 according to the present example embodiment includes a display panel 510, the gate driving part 120, the data driving part 130 and a timing control part 540.

The display panel 510 receives a data signal DS based on an image data DATA to display an image. The display panel 510 includes gate lines GL, data lines DL, a power voltage line VL, and a plurality of pixels P. The gate line GL extends in a first direction D1 and the data line DL extends in a second direction D2 substantially perpendicular to the first direction D1. Each of the pixels P includes a switching thin film transistor 620 electrically coupled to the gate line GL and the data line DL, a driving thin film transistor 630 coupled between the switching thin film transistor 620 and the power voltage line VL, a storage capacitor coupled between the switching thin film transistor 620 and the power voltage line VL, and an organic light emitting diode 900 coupled to the driving thin film transistor 630. Thus, the display panel 510 may be an organic light emitting display panel and the display apparatus 500 may be an organic light emitting display apparatus.

In addition, the display panel 510 may further include the watermarking displaying portion 370 of FIG. 9, and thus the display panel 510 may display the watermarking on the watermarking displaying portion 370.

The timing control part 540 receives the image data DATA and a control signal CON from an outside. The control signal CON may include a horizontal synchronous signal Hsync, a vertical synchronous signal Vsync and a clock signal CLK. The timing control part 540 generates the data start signal STH using the horizontal synchronous signal Hsync and outputs the data start signal STH to the data driving part 130. In addition, the timing control part 540 generates the gate start signal SW using the vertical synchronous signal Vsync and outputs the gate start signal SW to the gate driving part 120. In addition, the timing control part 140 generates the gate clock signal CLK1 and the data clock signal CLK2 using the clock signal CLK, outputs the gate clock signal CLK1 to the gate driving part 120 and outputs the data clock signal CLK2 to the data driving part 130.

Figure 16:
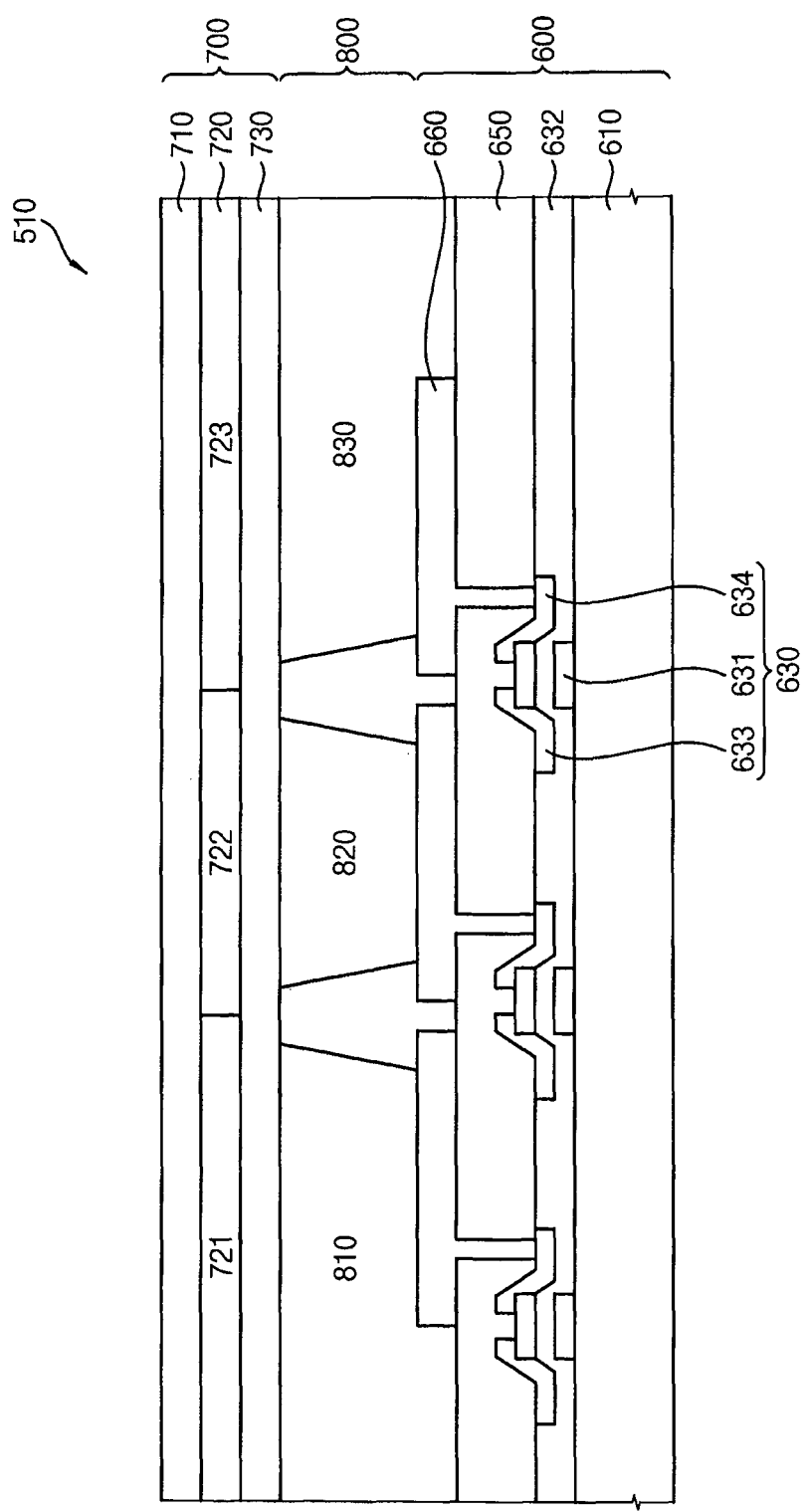
FIG. 16 is a cross-sectional view illustrating a display panel of FIG. 15.

FIG. 16 is a cross-sectional view illustrating the display panel 510 of FIG. 15.

Referring to FIGS. 15 and 16, the display panel 510 includes a first substrate 600, a second substrate 700, and an organic light emitting layer 800 positioned between the first substrate 600 and the second substrate 700.

The first substrate 600 includes a first base substrate 610, the driving thin film transistor 630 formed on the first base substrate 610 and including a gate electrode 631, a gate insulating layer 632, a source electrode 633 and a drain electrode 634, an organic insulating layer 650 covering the driving thin film transistor 630, and a pixel electrode 660 formed on the organic insulating layer 650 and electrically coupled to the drain electrode 634 of the driving thin film transistor 630 through a contact hole formed through the organic insulating layer 650.

The second substrate 700 includes a second base substrate 710 facing the first base substrate 610, a color filter layer 720 formed on the second base substrate 710, and a common electrode 730 formed on the color filter layer 720. The color filter layer 720 includes a first color filter 721, a second color filter 722, and a third color filter 723, and for example, the first color filter 721 may be a red color filter, the second color filter 722 may be a green color filter, and the third color filter 723 may be a blue color filter.

The organic light emitting layer 800 is positioned between the first substrate 600 and the second substrate 700. The light emitting layer 800 may include a red organic light emitting layer, a green organic light emitting layer, and a blue organic light emitting layer to generate a white color light. In addition, the light emitting layer 800 may include a first organic light emitting layer 810, a second organic light emitting layer 820 and a third organic light emitting layer 830, and respective the first organic light emitting layer 810, the second organic light emitting layer 820 and the third organic light emitting layer 830 may be the red organic light emitting layer, the green organic light emitting layer, and the blue organic light emitting layer.

The pixel electrode 660 of the first substrate 600, the common electrode 730 and the organic light emitting layer 800 forms the organic light emitting diode 900.

The display panel 510 may sequentially generate a red color light, a green color light, and a blue color light using the organic light emitting layer 800. Thus, the display panel 510 may generate the red color light, the green color light, and the blue color light in a field sequential color driving method.

The display panel 510 may display the watermarking on the display panel 510 using the red color light, the green color light, and the blue color light generated in the field sequential color driving method. For example, the display panel 510 may display the watermarking displayed on the watermarking displaying portion 370 of FIG. 9. In this case, the display panel 510 displays colors on the first area 371 of the watermarking displaying portion 370 in a first order, displays the colors on the second area 372 of the watermarking displaying portion 370 in a second order different from the first order and displays the colors on the third area 373 of the watermarking displaying portion 370 in a third order different from the first order and the second order. For example, the colors may include a red color, a green color, and a blue color. In addition, the colors may further include at least one of a black color or a white color.

For example, the display panel 510 may display the colors on the first area 371 of the watermarking displaying portion 370 in the first order illustrated in FIG. 10A, display the colors on the second area 372 of the watermarking displaying portion 370 in the second order illustrated in FIG. 10B and display the colors on the third area 373 of the watermarking displaying portion 370 in the third order illustrated in FIG. 10C.

The movable body 180 may move between the display panel 510 and the user 190 watching the image displayed on the display panel 510. The display panel 510 drives the organic light emitting diode 900 in the field sequential color driving method to generate the lights, the colors are provided to the first area 371 of the watermarking displaying portion 370 in the first order, the colors are provided to the second area 372 of the watermarking displaying portion 370 in the second order, the colors are provided to the third area 373 of the watermarking displaying portion 370 in the third order, the movable body 180 moves between the display panel 510 and the user 190, and thus the user 190 may watch the watermarking displayed on the watermarking displaying portion 370. Specifically, the display panel 510 generates the lights in the field sequential color driving method, therefore a static color break up is generated due to the movable body 180, and thus the user 190 may watch the watermarking displayed on the watermarking displaying portion 370. Thus, the user 190 may watch the watermarking when the movable body 180 moves between the display panel 510 and the user 190.

According to the present example embodiment, the watermarking is displayed using the static color break up generated by the field sequential color driving method in the organic light emitting display apparatus, therefore a problem of the static color break up may be decreased. In addition, the black color K is displayed during at least one of the first sub frame period SFP1 or the last sub frame period of the frame period FP, therefore a generation of a dynamic color break up may be prevented or reduced. Thus, a display quality of the display apparatus 500 may be improved.

According to the method of displaying the image and the display apparatus performing the method, a watermarking is displayed using a static color break up generated by a field sequential color driving method, therefore a problem of the static color break up may be decreased. In addition, a black color or a white color is displayed during at least one of a first sub frame period or a last sub frame period of a frame period FP, therefore a generation of a dynamic color break up may be prevented or reduced. Thus, a display quality of the display apparatus may be improved.

The foregoing is illustrative of embodiments of the present invention and is not to be construed as limiting thereof. Although a few example embodiments of the present invention have been described, those skilled in the art will readily appreciate that many modifications are possible in the example embodiments without materially departing from the novel teachings and aspects of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of some aspects of the embodiments of the present invention and is not to be construed as limited to the specific example embodiments disclosed, and that modifications to the disclosed example embodiments, as well as other example embodiments, are intended to be included within the scope of the appended claims. Embodiments of the present invention are defined by the following claims, and their equivalents.

What is claimed is:

1. A method of displaying an image, the method comprising:
    driving a light source of a display panel in a field sequential color driving pattern to display the image, the light source generating light having a plurality of colors;
    displaying the colors at a first area of the display panel in a first order, the first area comprising a first plurality of adjacent pixels; and
    displaying the colors at a second area of the display panel in a second order different from the first order, the second area being different from the first area and comprising a second plurality of adjacent pixels,
    wherein the image is a watermarking including information and the watermarking is displayed at the display panel when a movable object moves between a user and the display panel,
    wherein the colors comprise a first color and a second color different from the first color,
    wherein the displaying of the colors at the first area of the display panel in the first order comprises:
    displaying the first color at the first area of the display panel during a first sub frame period of a frame period; and
    displaying the second color at the first area of the display panel during a second sub frame period next to the first sub frame period of the frame period, and
    wherein the displaying of the colors at the second area of the display panel in the second order comprises:
    displaying the second color at the second area of the display panel during the first sub frame period; and
    displaying the first color at the second area of the display panel during the second sub frame period.

2. The method of claim 1, wherein the colors further comprise a black color different from the first color and the second color, and
    wherein the displaying of the colors at the first area of the display panel in the first order comprises displaying the black color at the first area of the display panel during at least one of a last sub frame period or the first sub frame period of the frame period.

3. The method of claim 1, wherein the colors further comprise a black color different from the first color and the second color, and
    wherein the displaying of the colors at the second area of the display panel in the second order comprises displaying the black color at the second area of the display panel during at least one of a last sub frame period or the first sub frame period of the frame period.

4. The method of claim 1, wherein the colors further comprise a white color different from the first color and the second color, and
    wherein the displaying of the colors at the first area of the display panel in the first order comprises displaying the white color at the first area of the display panel during at least one of a last sub frame period or the first sub frame period of the frame period.

5. The method of claim 1, wherein the colors further comprise a white color different from the first color and the second color, and
    wherein the displaying of the colors at the second area of the display panel in the second order comprises displaying the white color at the second area of the display panel during at least one of a last sub frame period or the first sub frame period of the frame period.

6. The method of claim 1, wherein the colors further comprise a third color different from the first color and the second color, the method further comprising:
    displaying the colors at a third area different from the first area and the second area of the display panel in a third order different from the first order and the second order.

7. The method of claim 6, wherein the displaying of the colors at the first area of the display panel in the first order comprises:
    displaying the first color at the first area of the display panel during the first sub frame period of the frame period;
    displaying the second color at the first area of the display panel during the second sub frame period next to the first sub frame period of the frame period; and
    displaying the third color at the first area of the display panel during a third sub frame period next to the second sub frame period of the frame period.

8. The method of claim 7, wherein the displaying of the colors at the second area of the display panel in the second order comprises:
    displaying the second color at the second area of the display panel during the first sub frame period;
    displaying the third color at the second area of the display panel during the second sub frame period; and
    displaying the first color at the second area of the display panel during the third sub frame period.

9. The method of claim 8, wherein the displaying of the colors at the third area of the display panel in the third order comprises:
    displaying the third color at the third area of the display panel during the first sub frame period;
    displaying the first color at the third area of the display panel during the second sub frame period; and
    displaying the second color at the third area of the display panel during the third sub frame period.

10. A display apparatus comprising:
    a light source configured to generate lights having a plurality of colors, the light source configured to be driven in a field sequential color driving method; and
    a display panel configured to:
        receive the lights to display an image;
        display the colors at a first area in a first order, the first area comprising a first plurality of adjacent pixels; and
        display the colors at a second area different from the first area in a second order different from the first order, the second area comprising a second plurality of adjacent pixels,
    wherein the image is a watermarking including information and the display panel is further configured to display the watermarking when a movable object moves between a user and the display panel, and
    wherein the colors comprise a black color, and the display panel is further configured to display the black color at the first area and the second area of the display panel during at least one of a last sub frame period or a first sub frame period of a frame period.

11. A display apparatus comprising:
a light source configured to generate lights having a plurality of colors, the light source configured to be driven in a field sequential color driving method; and
a display panel configured to:
receive the lights to display an image;
display the colors at a first area in a first order the first area comprising a first plurality of adjacent pixels; and
display the colors at a second area different from the first area in a second order different from the first order, the second area comprising a second plurality of adjacent pixels,
wherein the image is a watermarking including information and the display panel is further configured to display the watermarking when a movable object moves between a user and the display panel, wherein the colors comprise a white color, and
the display panel is further configured to display the white color at the first area and the second area of the display panel during at least one of a last sub frame period or a first sub frame period of a frame period.

12. The display apparatus of claim 10, wherein the display panel is an organic light emitting display panel, and the light source comprises an organic light emitting diode in the organic light emitting display panel.

* * * * *